US00RE47868E

(19) United States
(12) Reissued Patent
Erb et al.

(10) Patent Number: US RE47,868 E
(45) Date of Reissued Patent: Feb. 25, 2020

(54) FOOTBALL HELMET SHELL

(71) Applicant: Kranos IP Corporation, Litchfield, IL (US)

(72) Inventors: Robert Erb, Plandome, NY (US); Cortney Warmouth, Edwardsville, IL (US); Vincent R. Long, St. Peters, MO (US); Louis Anthony VanHoutin, Iuka, IL (US); Michael Princip, Winston-Salem, NC (US)

(73) Assignee: Kranos IP Corporation, Litchfield, IL (US)

(21) Appl. No.: 29/684,722

(22) Filed: Mar. 22, 2019

Related U.S. Patent Documents

Reissue of:
(64) Patent No.: Des. 836,253
Issued: Dec. 18, 2018
Appl. No.: 29/606,636
Filed: Jun. 6, 2017

(51) LOC (12) Cl. ..... 29-02
(52) U.S. Cl.
USPC ..... D29/106
(58) Field of Classification Search
USPC ..... D29/102–107, 122
CPC ... A42B 3/221–223; A42B 3/18; A42B 3/185; A42B 3/20; A42B 3/00; A42B 3/003; A42B 3/0406; A42B 3/0493; A42B 3/06; A42B 3/228
See application file for complete search history.

(56) References Cited

U.S. PATENT DOCUMENTS

D465,067 S 10/2002 Ide et al.
D466,651 S 12/2002 Halstead et al.
D511,026 S 10/2005 Ide et al.
D512,534 S * 12/2005 Maddux ..... D29/106
D528,705 S 9/2006 Ide et al.
D581,599 S * 11/2008 Ferrara ..... D29/106
D582,607 S * 12/2008 Ferrara ..... D29/106
D587,852 S * 3/2009 Nimmons ..... D29/106
D587,853 S * 3/2009 Nimmons ..... D29/106
D603,099 S * 10/2009 Bologna ..... D29/106
D625,050 S * 10/2010 Chen ..... D29/106
D654,630 S * 2/2012 Chou ..... D29/106
D678,617 S * 3/2013 Erb ..... D29/106
D681,281 S * 4/2013 Bologna ..... D29/106
D697,270 S * 1/2014 Simpson ..... D29/106
D699,895 S * 2/2014 Hill ..... D29/102
D747,040 S * 1/2016 Milam ..... D29/106
9,289,024 B2 * 3/2016 Withnall ..... A42B 3/20
9,314,063 B2 * 4/2016 Bologna ..... A42B 3/20
D764,116 S * 8/2016 Collette ..... D29/106
D764,716 S * 8/2016 Bologna ..... D29/102
D766,517 S * 9/2016 Collette ..... D29/106
9,498,014 B2 11/2016 Princip et al.
(Continued)

*Primary Examiner* — Philip S Hyder
(74) *Attorney, Agent, or Firm* — Notaro, Michalos & Zaccaria P.C.

(57) CLAIM

The ornamental design for a football helmet shell, as shown and described.

DESCRIPTION

FIG. 1 is a left, top, perspective view of a football helmet shell showing our design therefor;
FIG. 2 is a front elevational view thereof;
FIG. 3 is a rear elevational view thereof;
FIG. 4 is a right side elevational view thereof;
FIG. 5 is a left side elevational view thereof;
FIG. 6 is a top plan view thereof; and,
FIG. 7 is a bottom plan view thereof.

1 Claim, 7 Drawing Sheets

Figure 1:
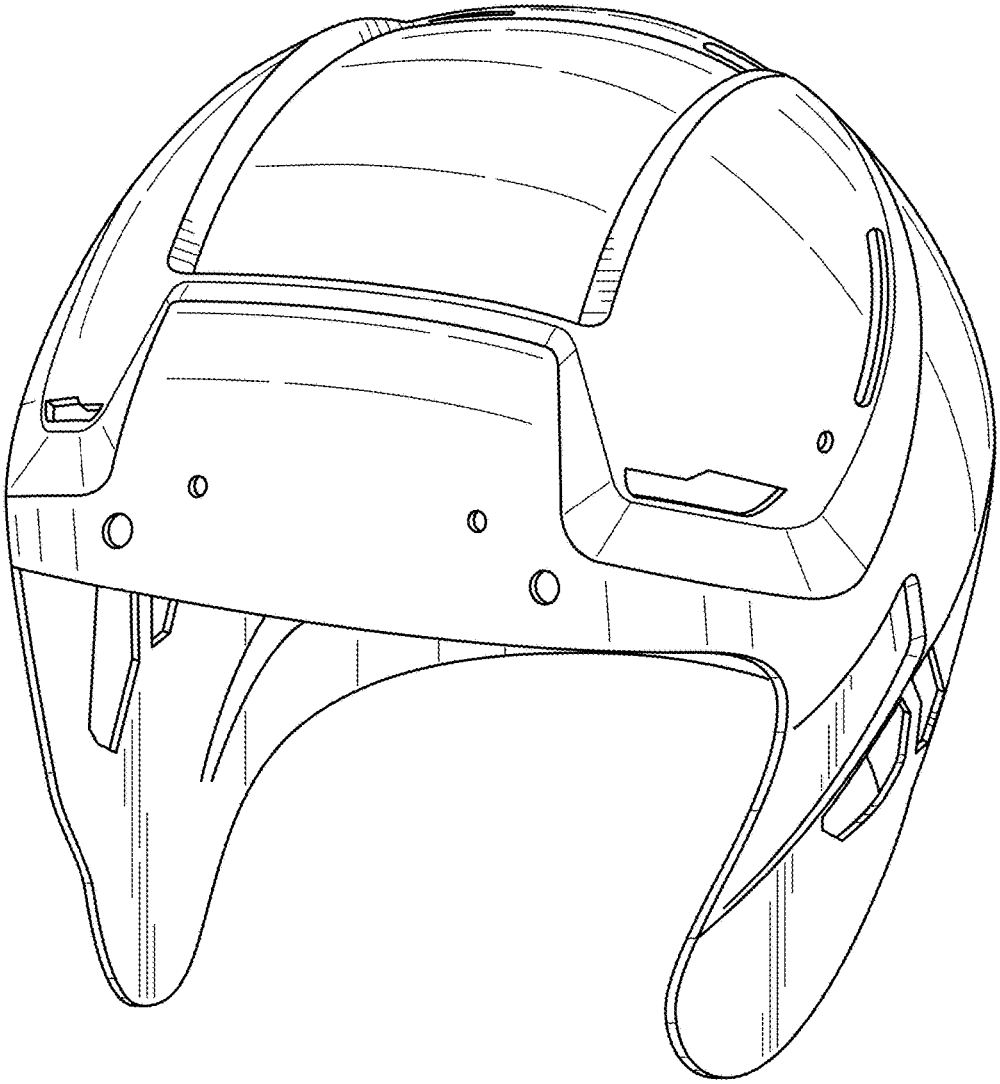
Figure 2:
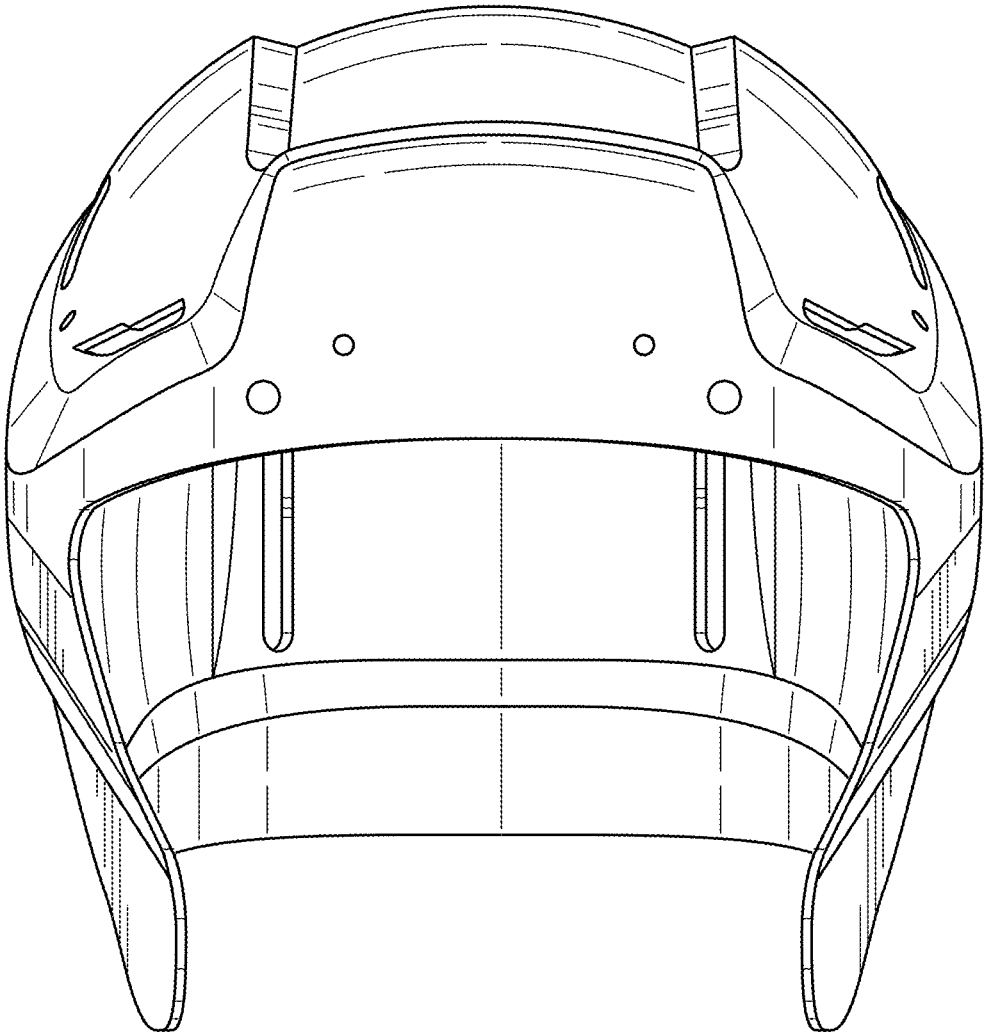
Figure 3:
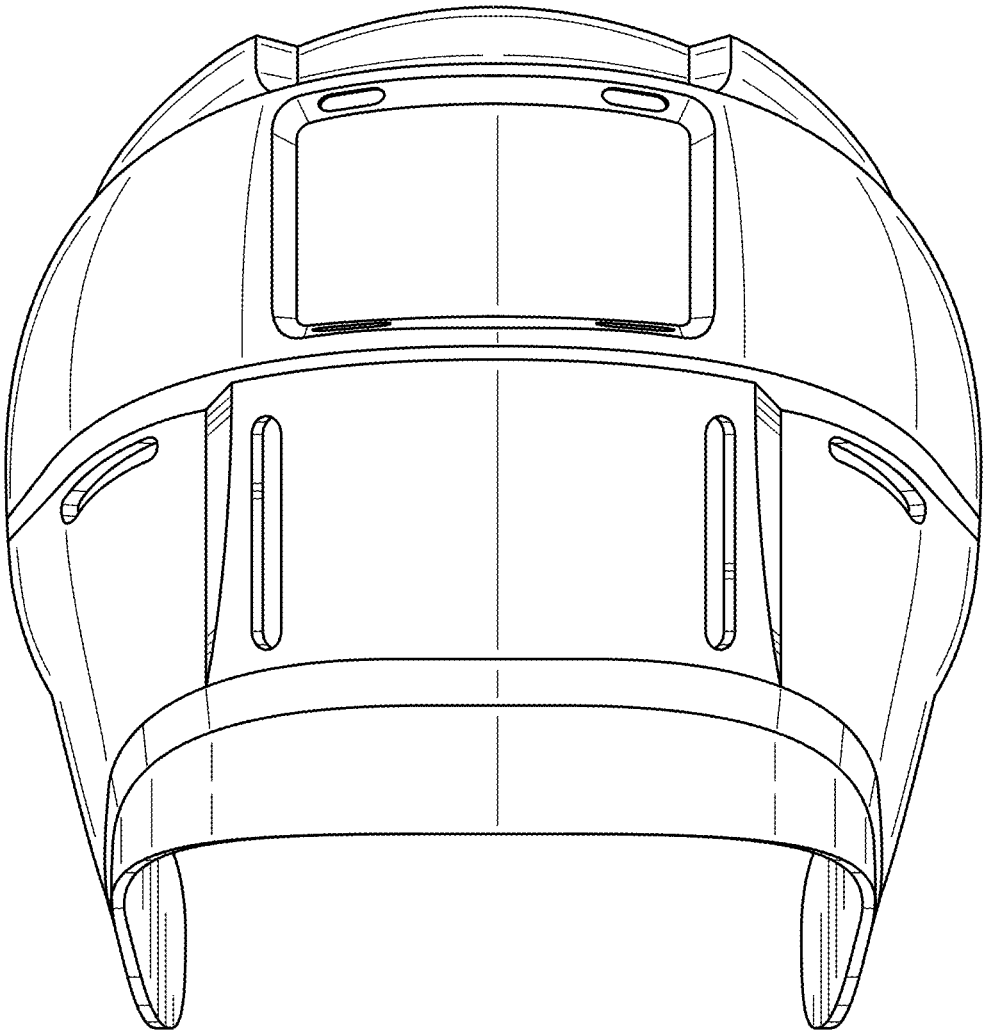
Figure 4:
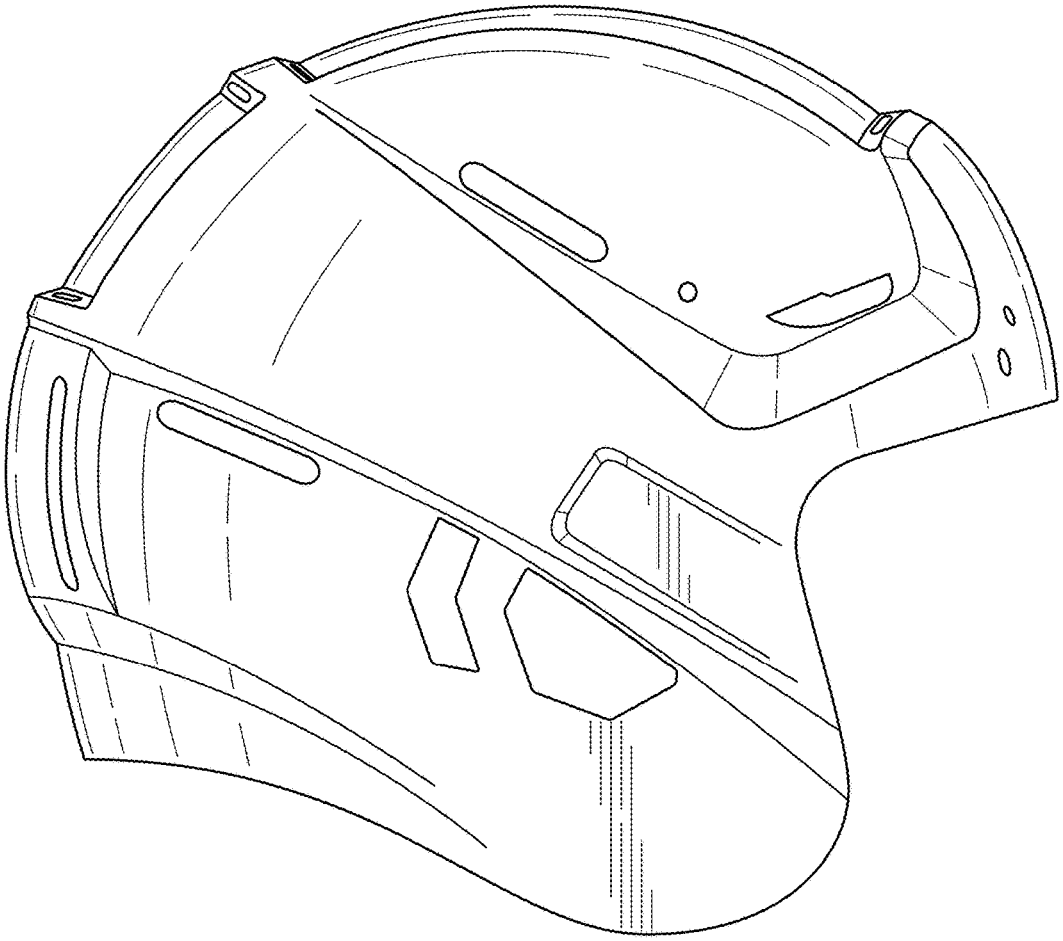
Figure 5:
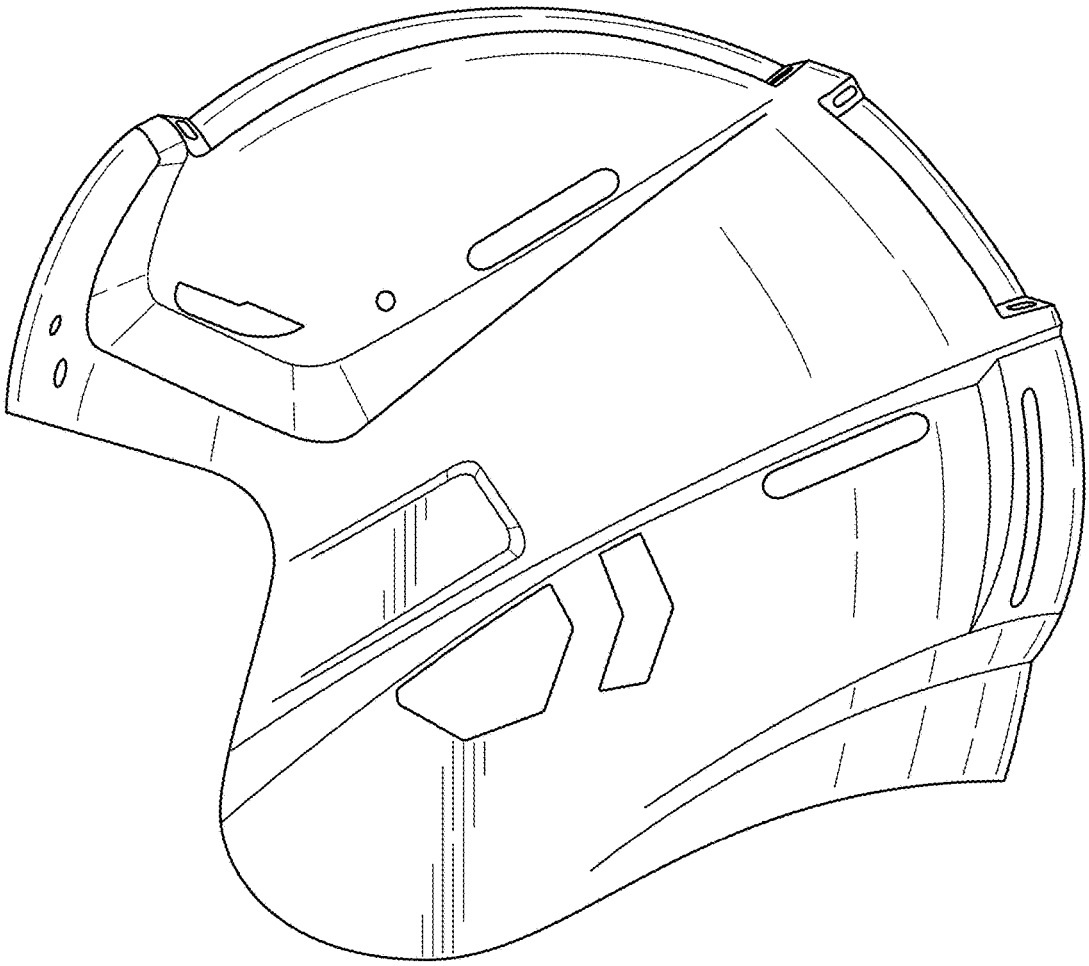
Figure 6:
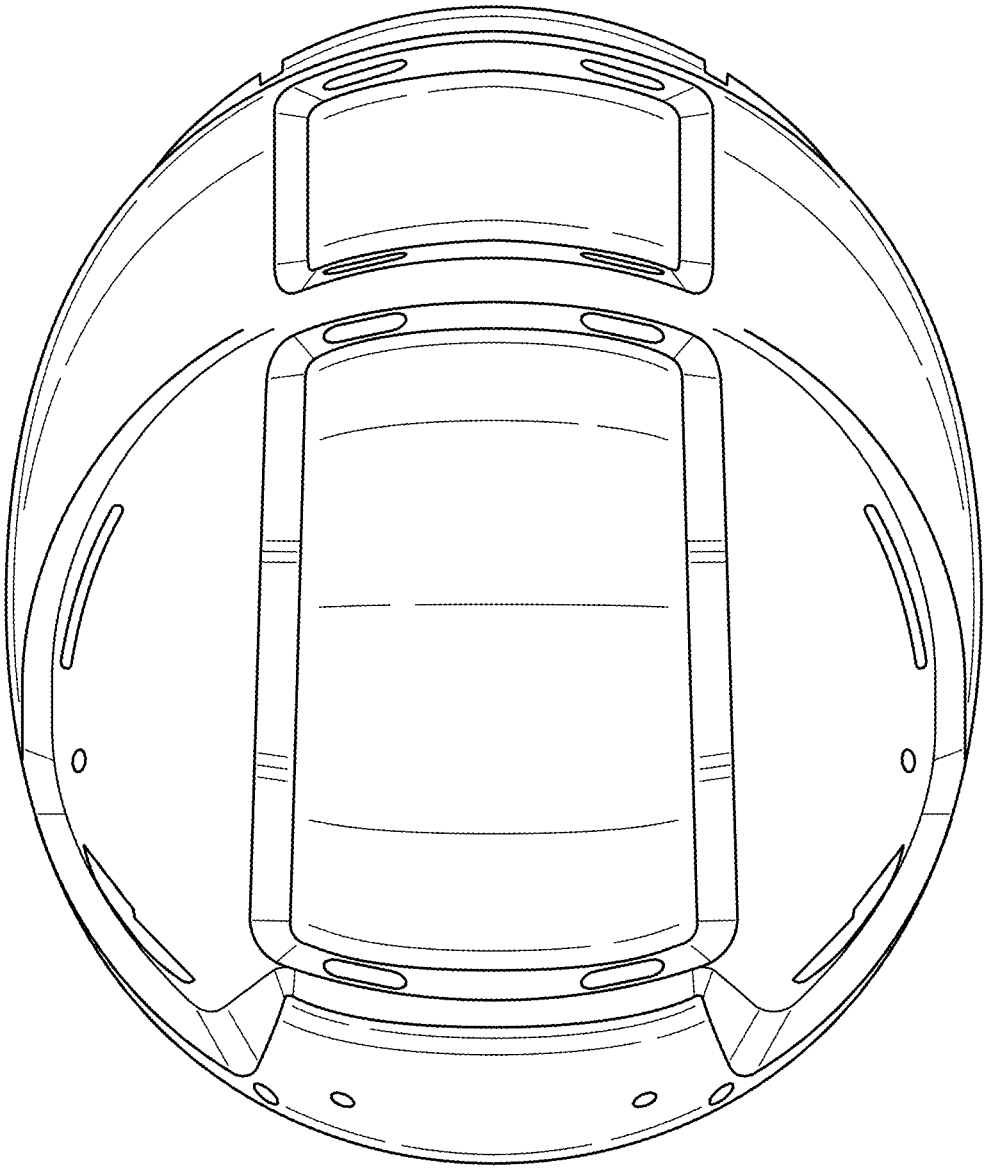
Figure 7:
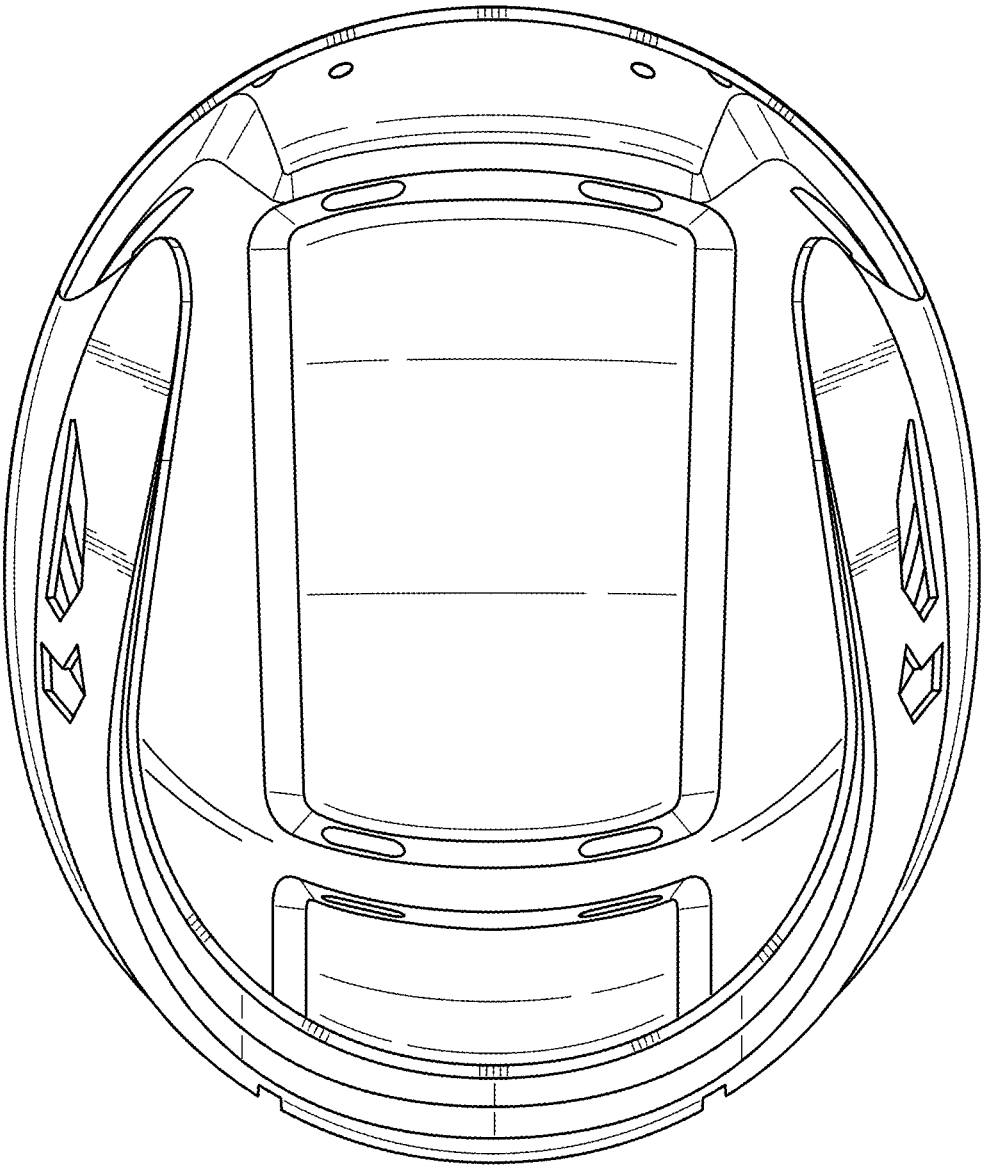

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D773,738 | S | * | 12/2016 | Collette | D29/102 |
| D778,504 | S | * | 2/2017 | Collette | D29/106 |
| 9,656,148 | B2 | * | 5/2017 | Bologna | A42B 3/20 |
| D805,255 | S | * | 12/2017 | Hefer | D29/102 |
| 2017/0291095 | A1 | | 10/2017 | Erb et al. | |
| 2018/0343953 | A1 | | 12/2018 | Erb et al. | |

* cited by examiner